US006947387B1

(12) United States Patent
Saw (10) Patent No.: US 6,947,387 B1
(45) Date of Patent: Sep. 20, 2005

(54) VIDEO DATA RESENDING METHOD

(75) Inventor: Yoo Sok Saw, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,729

(22) Filed: Dec. 31, 1998

(30) Foreign Application Priority Data

Oct. 10, 1998 (KR) .................................. 98-43090

(51) Int. Cl.[7] ............................ H04L 1/00; H04L 1/18
(52) U.S. Cl. ...................................... 370/252; 714/748
(58) Field of Search .......................... 370/203, 210, 370/477, 216, 412, 252; 375/24.18, 240.2, 375/240.23, 240.24; 714/48, 746, 748, 799; 386/2, 46, 47, 49, 51

(56) References Cited

U.S. PATENT DOCUMENTS

| | | | | |
|---|---|---|---|---|
| 3,927,251 A | * | 12/1975 | White et al. | 358/426.09 |
| 5,031,179 A | * | 7/1991 | Yoshida et al. | 371/32 |
| 5,191,446 A | * | 3/1993 | Hamano et al. | 358/463 |
| 5,216,503 A | * | 6/1993 | Paik et al. | 348/390.1 |
| 5,537,416 A | * | 7/1996 | MacDonald et al. | 371/32 |
| 5,559,557 A | * | 9/1996 | Kato | 348/405 |
| 5,563,895 A | * | 10/1996 | Malkamaki et al. | 371/32 |
| 5,768,533 A | * | 6/1998 | Ran | 395/200.77 |
| 5,918,002 A | * | 6/1999 | Klemets et al. | 395/182.16 |
| 6,014,765 A | * | 1/2000 | Maeda et al. | 714/748 |
| 6,121,998 A | * | 9/2000 | Voois et al. | 348/14.13 |
| 6,124,882 A | * | 9/2000 | Voois et al. | 348/14.08 |
| 6,141,784 A | * | 10/2000 | Davis et al. | 714/748 |
| 6,151,696 A | * | 11/2000 | Miller et al. | 714/748 |
| 6,163,869 A | * | 12/2000 | Langmann | 714/748 |
| 6,282,683 B1 | * | 8/2001 | Dapper et al. | 714/746 |
| 6,356,309 B1 | * | 3/2002 | Masaki et al. | 348/439.1 |
| 6,530,055 B1 | * | 3/2003 | Fukunaga | 714/746 |

* cited by examiner

Primary Examiner—Hassan Kizou
Assistant Examiner—Hong Sol Cho
(74) Attorney, Agent, or Firm—Fleshner & Kim, LLP (57) ABSTRACT

A video data resending apparatus and method is disclosed. The present invention is capable of performing a selective resending process with respect to a local bit error of a previously sent video data packet, using a CONTRAX-PAND™ buffer. The present invention has the effect of overcoming a time delay and overcoming sending suspension due to the resending of the video data. Also, the present invention can accurately block a distortion propagation to the adjacent video due to the local bit error.

30 Claims, 6 Drawing Sheets

VIDEO DATA RESENDING METHOD

BACKGROUND OF THE INVENTION

1. Field of the Invention

The present invention relates to a video data sending service, and more particularly to a video data resending method capable of selectively resending video data packet using a CONTRAXPAND™ buffer.

2. Description of the Prior Art

In the international standardization of mobile communication techniques centering around a wideband code division multiplexing access (W-CDMA) technique, a mobile video data communication standard has been proposed recently by a recommendation of the International Telecommunications Union Telecommunications Standard (hereinafter "ITU-T") on a television transmission line and audio broadcast transmission line.

In such international standards on the mobile video data communication, a video buffering technique is commonly used. The video buffer temporarily stores the compression-coded variable-rate video data for a predetermined time period prior to outputting the data at a rate matching the communication channel. If a communication channel is a variable bit rate type in which data is processed regardless of a variation in the rate of compressed video data, no buffering is required. However, in most wire/wireless digital communications, the communication channels have a constant bit rate. As a result, a video buffering technique capable of controlling the variable-rate video data adaptively to a constant-bit rate communication channel is required.

Also, even in the case where a communication channel is the variable bit rate type, a network is congested upon inputting video data of a rate higher than the maximum variable rate of the communication channel. In order to prevent such a congestion, a video buffering technique which limits the rate of video data or a rate control technique similar thereto is required.

Moreover, according to the international standards on the mobile video data communication, several error control techniques are employed to increase resilience on the generation of a bit error of compression-coded variable-rate video data on a transmission channel. In particular, error control techniques such as resynchronization, data partitioning and reversible variable length coding are applied to a MPEG-4 of the Moving Picture Experts Groups (hereinafter "MPEGs"). These error control techniques provide improvements in picture quality in the order of 2–3 dB.

One last item of international standards on resending of mobile video data is a protocol for enabling the resending of compressed video data. This protocol contains an adaptation layer-3 (hereinafter "AL3") which is separately defined for the video. The AL3 is a layer for notifying a specific packet address for resending a damaged video packet when a video packet is damaged. Accordingly, a prestored packet corresponding to the specific packet address is resent.

Figure 1:
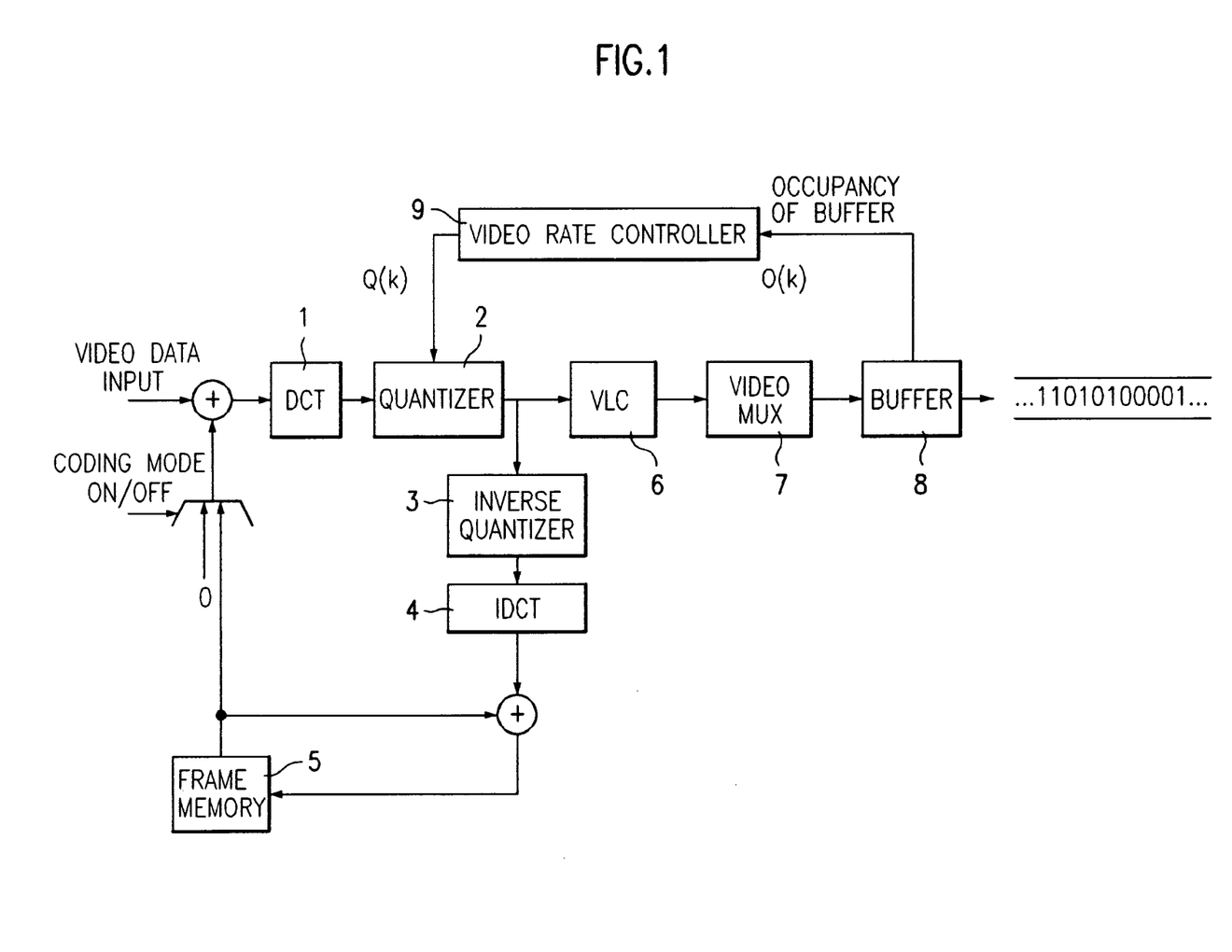
FIG. 1 is a block diagram showing a conventional video data compression apparatus.

FIG. 1 is a block diagram showing a conventional video data compression apparatus in the related art. This video data compression apparatus is a basic model defined in an international standard on video compression coding, or ITU-T H.263, MPEG-1, MPEG-2 and MPEG-4. As shown in FIG. 1, the video data compression apparatus comprises a discrete cosine transform (hereinafter "DCT") unit 1 inputting macro block-unit video data before compression, a quantizer 2, an inverse quantizer 3, an inverse discrete cosine transform (hereinafter "IDCT") 4, and a frame memory 5 for video storage. The video data compression apparatus further comprises a variable length coder (hereinafter "VLC") 6 converting video data quantized by the quantizer 2 into variable-length data, a video multiplexer 7, and a buffer 8 outputting the compressed video data.

The buffer 8 acts as a single port for input/output of video data. The buffer 8 has an occupancy which is periodically monitored on the basis of an address difference between a read pointer and a write pointer. Also, the buffer 8 notifies a video rate controller 9 coupled with the quantizer 2 of the monitored occupancy. The buffer 8 forms a feedback loop with the video rate controller 9.

The video rate controller 9 judges the occupancy O(k) of the buffer 8 and transfers a proper quantization coefficient Q(k) to the quantizer 2 according to the judged result.

The quantization coefficient Q(k) is a quantization step size of any one of 31 integers from 1 to 31. When the quantization coefficient Q(k) is large, the amount of output data from the quantizer 2 is reduced. If the quantization coefficient Q(k) is small, the amount of output data from the quantizer 2 is increased.

Variable-rate and variable-length video data, compression-coded by the quantizer 2, the VLC 6 and the video multiplexer 7, are serially input to the buffer 8. From the buffer 8, the data is serially output at a constant-rate variable-length video data in the input order.

Figure 2A:
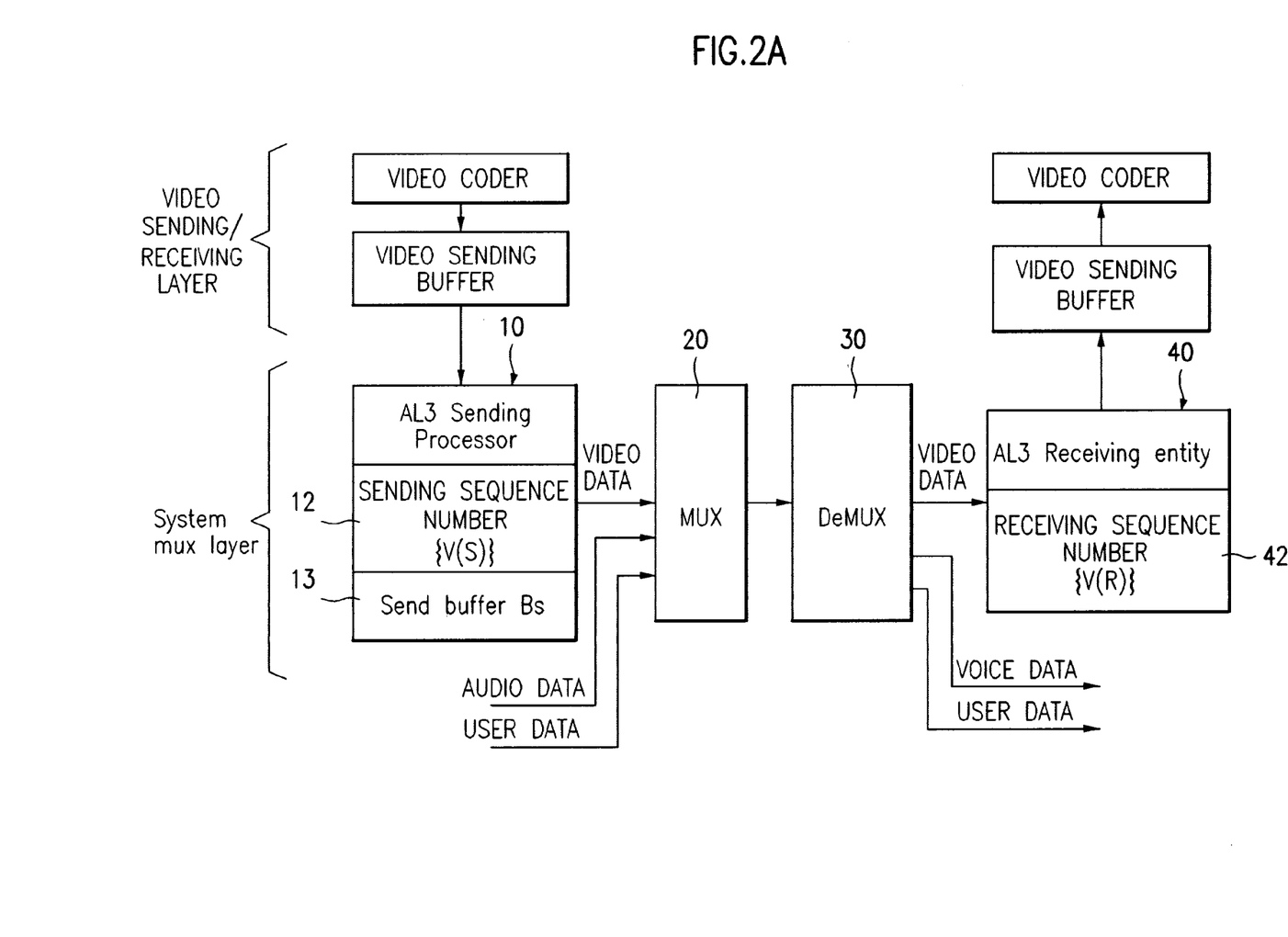
FIGS. 2a and 2b show conventional video data sending and resending processes.
Figure 2B:
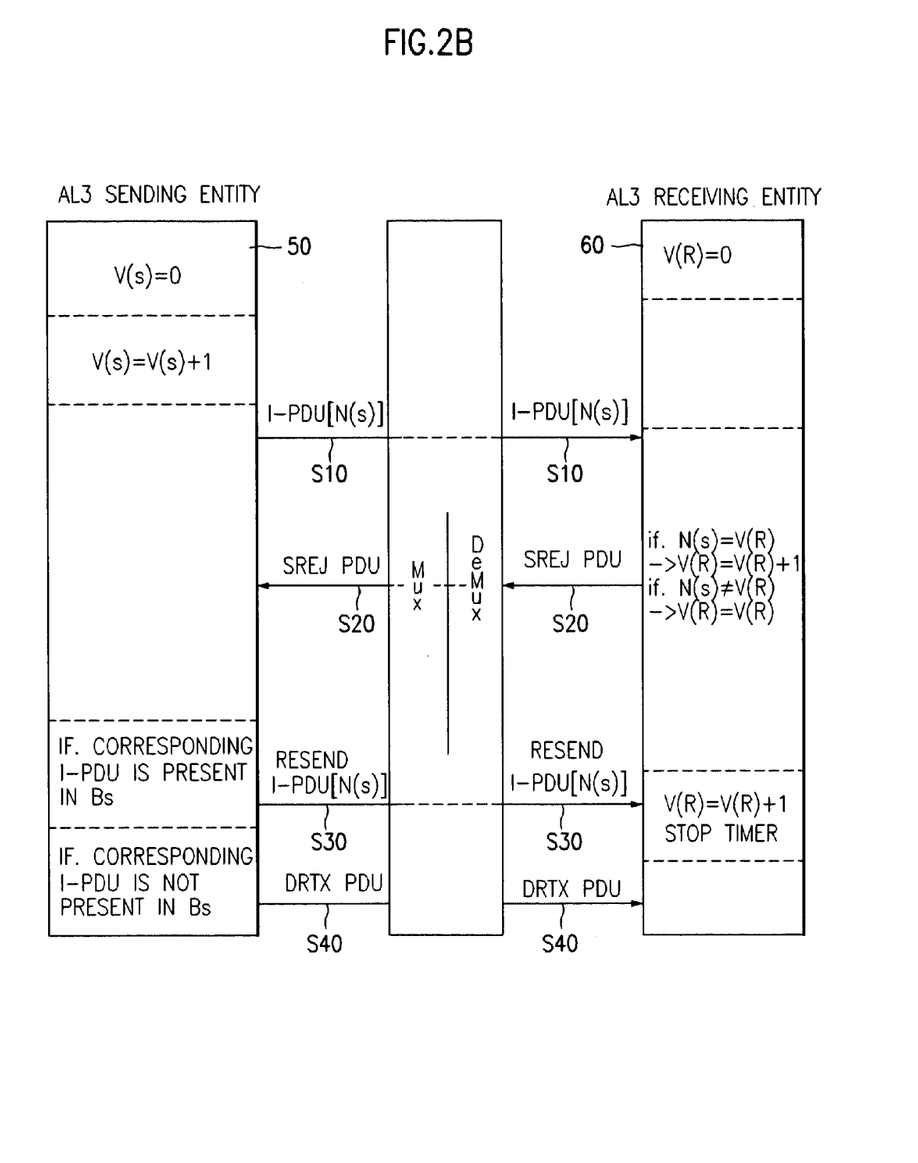

In real communication systems, a first-in first-out (hereinafter "FIFO") unit is often used as the buffer 8 which is subjected to a serial input/output control operation where a random access operation is invalid. This FIFO unit has a functional pin usable to indicate an occupancy full or an occupancy empty state. FIGS. 2a and 2b show a conventional video data sending and resending processes.

FIG. 2a is a block diagram illustrating a video data sending process based on the ITU-T H.223 and shows a system multiplexing layer provided to perform the video data sending process. The system multiplexing layer comprises a sender including a AL3 Sending processor 10 and multiplexer 20, and a receiver including a demultiplexer 30 and receiving AL3 processor 40.

The sending AL3 further includes a send buffer Bs 13 resending a packet to be sent and a sending sequence number V(S) 12 of an I-PDU to be sent. The sending sequence number V(S) 12 of the I-PDU is incremented by one whenever the I-PDU is sent. The most recently sent I-PDU is stored in the send buffer Bs 13. The minimum size of the send buffer Bs 13 required by the sending AL3 processor 10 is defined in the ITU-T H.324, and the actual buffer size thereof is transferred to the receiver through an open logical channel based on ITU-T H.245.

An "N(S)" is defined as a sequence number of an I-PDU sent by the sender, which becomes equal to a sequence number "N(R)" of an I-PDU to be received by the receiver. When a sending sequence number N(S) of the subsequent I-PDU to be received is at a standby state and becomes equal to a receiving sequence number N(R), the receiver recognizes that the I-PDU has been sent normally. Whenever the I-PDU is normally received, a receiving sequence number V(R) 42 is incremented by one.

FIG. 2b is a flowchart illustrating a video data resending process based on the ITU-T H.245. The sender may have two reactions in response to a resending request from the receiver. One reaction is to directly pass a requested I-PDU, and the other reaction is to reject the resending request when the resending operation is invalid.

The sending of the requested I-PDU essentially requires a reverse logical channel, which is defined in the ITU-T H.245. The "reverse logical channel" is a dedicated control channel used to control and maintain the configuration of a call. This reverse logical channel manages a call between the sender and the receiver together with a forward logical channel.

These two control channels exchange various characteristic information of the terminals before a call is configured. During communication, the control channels detect a connection state of the call and perform operations corresponding to the detected connection state. Also, upon occurrence of a problem, the control channels indicate and control the problem. Moreover, in the process of sending the requested I-PDU, the control channels send a resending request message SREJ PDU to the sender and wait for a response.

In FIG. 2b, if an AL3 sending entity 50 appends a sequence number V(S) of an I-PDU to be sent and sends the resultant I-PDU, an AL3 receiving entity 60 checks whether a sequence number N(S) of the currently sent I-PDU is equal to a sequence number V(R) of an I-PDU to be received (step S10). If the two sequence numbers are equal, the AL3 receiving entity 60 normally performs an operation for reception of the subsequent I-PDU.

However, in the case where the sequence number N(S) of the sent I-PDU is not equal to the sequence number V(R) of the I-PDU received, the AL3 receiving entity 60 sends a resending request message SREJ PDU to the AL3 sending entity 50 (step S20). Upon receiving the resending request message SREJ PDU from the AL3 receiving entity 60, the AL3 sending entity 50 checks whether the I-PDU of the corresponding sequence number is still present in the send buffer Bs 13 and resends the corresponding I-PDU in accordance with the checked result (step S30).

If the corresponding I-PDU is not present in the send buffer Bs 13, the AL3 sending entity 50 sends a resending disable message DRTX PDU to the AL3 receiving entity 60 (step S40). The AL3 receiving entity 60 stops its timer either at the resending enable state or at the resending disable state and receives the subsequent I-PDU. As a result, the resending operation is terminated.

In the conventional video data sending and resending processes, the normal sending operation must be suspended once the resending operation is advanced. Consequently, the conventional video data sending and resending processes are disadvantageous because if the normal video data sending operation is often suspended for a long time for the video data resending operation, the successive process of the subsequent video data by the sender must also be stopped.

Moreover, the successive sending of the subsequent video data may not be stopped, even if a video data resending request is generated by the receiver. In such case, data overflows to the buffer included in the video data compression apparatus, resulting in a discontinuance in communication for the normal video data sending operation.

Furthermore, in the conventional video data resending process, the previously packeted video data is processed as a basic unit for sending. As a result, when a local damage of a video data packet occurs, rather than only the associated video data portion of the video data packet being resent, all video data portions of the video data packet must be resent. Thus, when the resending operation is required only with respect to a specific position on a picture, the specific position cannot be separately processed.

On the other hand, in a video sending/receiving layer of FIG. 2a, an error is recognized and processed by a video decoder based on the ITU-T H.263 and MPEG. The generation of a bit error may be judged differently according to how the video decoder is designed. In most wire communication environments, a video decoder has no separate error correction means. As a result, if an error is generated, the video decoder has to retrieve a header code GOB or a picture start code indicating the start of a picture for resynchronization. However, because all information cannot be restored up to a bit position for the resynchronization, a distorted picture or the previous picture appears on the screen.

There may be various approaches to the recognition of error generation by the video decoder in restoring the video data. First, in the case of a fixed-length code, an error is recognized when a fixed-length error value is not a predetermined value or the processed result is not a defined value. In such case, it is possible to continuously decode the subsequently sent bit streams.

In the case where an error is generated in a variable-length code, it is impossible to continuously decode the subsequently sent bit streams. When an error occurs and a variable-length error value cannot be retrieved from a defined table or a faulty value is retrieved from the defined table, the processed result is beyond a defined range. As a result, the video decoder abandons all of the subsequent data and turns to an operation of scanning a bit position for the next synchronization.

In this manner, an error generation can readily be recognized because an abnormal variable-length decoding usually appears just after the error generation. However, except for the fixed-length codes for synchronization, such as a header, a significant problem is in the generation of an error in a fixed-length data. This error generation may not immediately be recognized or it may not be recognized at all, resulting in an accumulation in the picture distortion.

Upon recognizing an error, the video decoder generally processes the error by an error concealment, in which video information at the corresponding position is replaced with the surrounding picture information or the same position video information of the previous picture.

In conclusion, when a resending request is sent with respect to an error recognized by the video decoder in FIG. 2a, the request cannot appropriately be accommodated by the system multiplexing layer and video coder. Furthermore, the system multiplexing layer has a disadvantage in that it recognizes and resends data only in a packet unit because it cannot individually recognize video information in the packet. In addition, a buffer coupled with the conventional video coder cannot separately send video data therein.

SUMMARY OF THE INVENTION

Accordingly, an object of the present invention is to solve at least the problems and disadvantages of the related art.

An object of the present invention is to provide a video data resending method for performing a resending process with respect to a local bit error of a video, using a CONTRAXPAND™ buffer.

Another object of the present invention to provide a video data resending method capable of reducing a delay in video data sending time resulting from resending of video data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video data resending method comprises the steps of transferring error information recognized in a video data decoding process to a sender and requesting the sender to resend video data corresponding to the error information; and packeting the requested video data with video data to be currently sent and sending the resultant packet.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 3A:
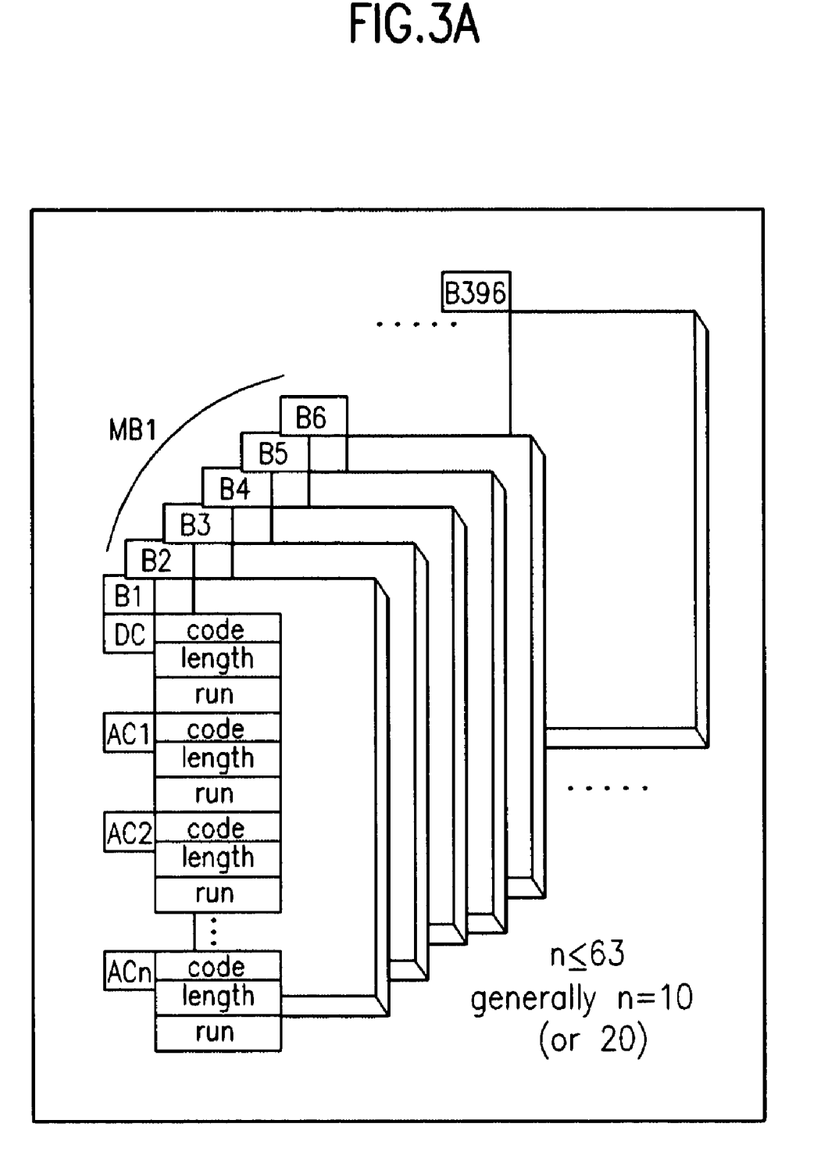
FIG. 3a is a view showing a CONTRAXPAND™ buffer used for sending and resending between a video coder and a video decoder according to the present invention.

FIG. 3a shows the construction of a CONTRAXPAND™ buffer used for sending and resending data between a video coder and a video decoder according to the present invention. In the present invention, the CONTRAXPAND™ buffer is used as the buffer 8 in FIG. 1.

Referring to FIG. 3a, the CONTRAXPAND™ buffer is partitioned according to variable-length codes. Namely, because memory regions are divided according to the variable-length codes, it is possible to gain individual accesses to the CONTRAXPAND™ buffer in the unit of the variable-length codes. The CONTRAXPAND™ buffer is also partitioned according to blocks B1–B396, each of which includes the variable-length code-unit memory regions QDC, QAC1, QAC2, . . . , QACn. The quantized and variable length coded DCT coefficients are stored into each of the variable-length code-unit memory regions.

Figure 3B:
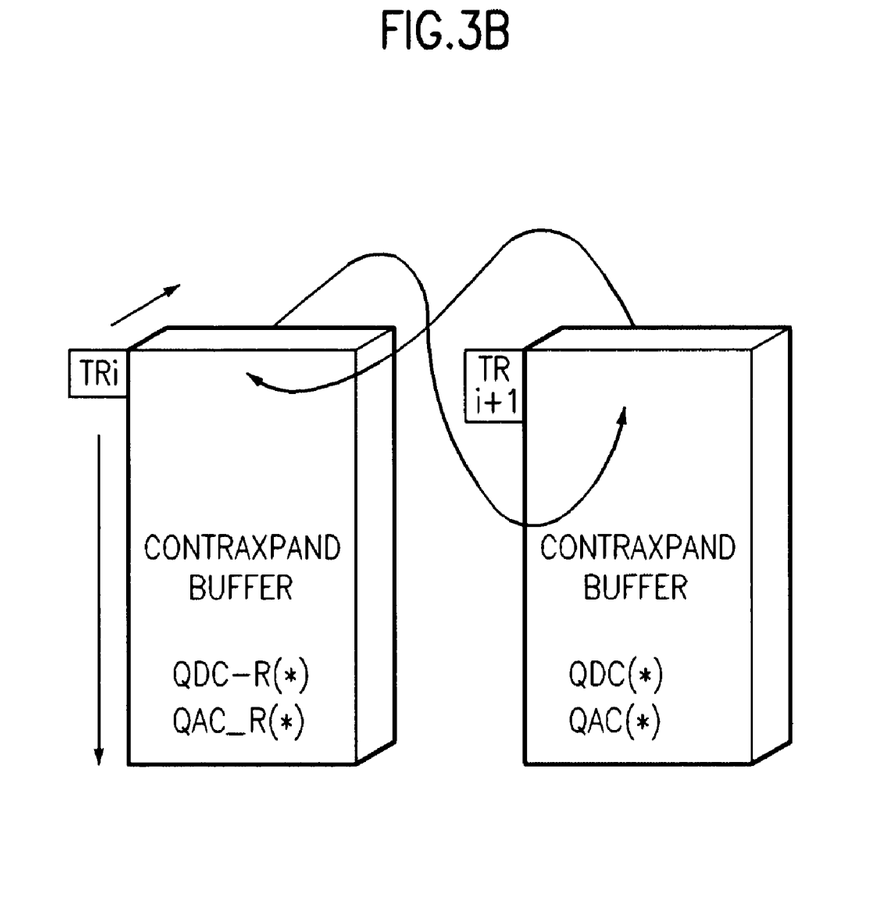
FIG. 3b is a schematic view illustrating an interconnection between a plurality of CONTRAXPAND™ buffers.

Every six of the blocks B1–B396 constitute a corresponding one of macro blocks MBA–MB66. The system provides block-unit header codes and macro block-unit macro header codes to the CONTRAXPAND™ buffer. Also, each of the blocks B1–B396 includes code regions for storing the variable-length codes according to direct and alternating current components QDC and QAC, length regions for indicating bit lengths of the code regions, and run regions for indicating execution of the direct or alternating current components QDC or QAC of the corresponding block. FIG. 3b is a schematic view illustrating an interconnection between a plurality of CONTRAXPAND™ buffers.

Referring to FIG. 3b, the system comprises a plurality of CONTRAXPAND™ buffers to increase the entire buffer capacity. With the increase of buffer capacity, a data write operation is performed with respect to one buffer while a data read operation is performed with respect to other buffers. The "TR" value is a temporal reference corresponding to a time stamp, which has any integer within the range from 1 to 255.

Figure 4:
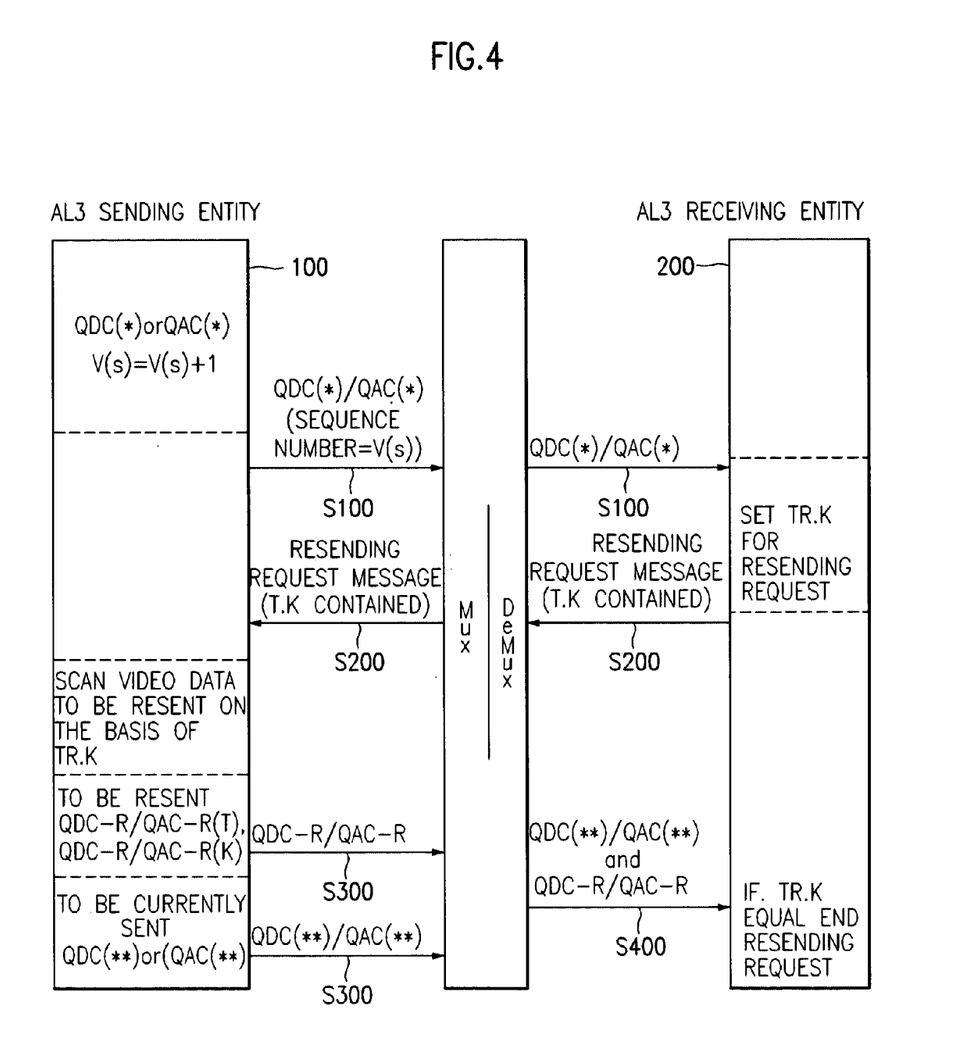
FIG. 4 is a flowchart illustrating a resending process between the video coder and the video decoder according to the present invention.

FIG. 4 is a flowchart illustrating a resending process between the video coder and the video decoder according to the present invention. The video coder and video decoder is coupled with the system multiplexing layer. If a normal sending process is performed with respect to all video data of one picture, the CONTRAXPAND™ buffer stores the video data in the block units including variable length codes, according to a circular addressing manner.

As stated previously with reference to FIG. 3, each block includes a direct and an alternating current components QDC and QAC having variable-length codes, respectively. In other words, the CONTRAXPAND™ buffer is a separate memory with the combination of quantized direct current components (hereinafter "QDCs") and quantized alternating current components (hereinafter "QACs"), placed respectively in the memory cells.

Each block includes a resending memory region QDC-R having the same size as that of the QDC. Also, each block includes the QACs at memory locations of 1 to 63 and resending memory regions QAC1-R to QAC63-R (see FIG. 3b). For example, when a $TR_{i+1}$ CONTRAXPAND™ buffer is used for the normal sending process, a $TR_i$ CONTRAXPAND™ buffer stores video data QDC-R(*) and QAC-R(*) sent before the $TR_{i+1}$ to enable a selective resending process.

The $TR_{i+1}$ buffer and the $TR_i$ buffer function in a complementary manner and alternate in the storage functions over the lapse of time. The additional memory regions are used to store quantized variable-length codes necessary for resending such that they are available upon generation of a resending request.

The resending request is generated by the video decoder, and a position of the information to be resent is transferred according to the type of a control channel based on ITU-T H.245. Thus, the resending request and response are supported by the H.245 protocol, and the actual resending is established between the video coder and the video decoder.

Upon receiving no resending request from the AL3 receiving entity 200, the CONTRAXPAND™ buffer does not use the memory regions QDC-R/QAC-R and it performs a normal video data sending operation (step S100). After all video data of one picture are processed, namely after the video data with a sequence number V(S) of an arbitrary QDC(*)/QAC(*) are multiplexed and demultiplexed, and sent to the AL3 receiving entity 200 (step S100), if a resending request is transferred through the H.245 channel, the resending operation is started with respect to the corresponding video data.

The AL3 receiving entity 200 sends a resending request message to an AL3 sending entity 100 (step S200). The resending request message contains values TR and K indicative of a memory address and range of the corresponding QDC-R/QAC-R. The video data QDC-R/QAC-R(TR,K) to be resent is scanned on the basis of the values TR and K contained in the resending request message, multiplexed with video data to be currently sent and sent to the AL3 receiving entity 200 (steps S300 and S400).

The AL3 receiving entity 200 processes both the normally sent video data and resent video data for picture decoding and restoration. The AL3 receiving entity 200 checks whether values TR and K of the resent video data QDC-R/QAC-R(TR,K) are equal to the values TR and K contained in the resending request message. If these values are equal, the AL3 receiving entity 200 ends the resending process.

While the resending operation is performed, the actual sending rate is reduced by an amount equivalent to the rate of resending. However, the rate is only reduced when the resending time exceeds the total capacity of the CONTRAXPAND™ buffer. Also, in most cases, the resending rate is very short and causes insignificant rate reduction, if any.

As apparent from the above description, according to the present invention, video data to be resent is packeted with video data to be currently sent. Thereafter, both data are sent, thereby overcoming a time delay as well as eliminating the need to suspend sending due to the resending of the video data. Furthermore, the resending process can be performed with respect to a local bit error of a video using the CONTRAXPAND™ buffer which can divide and store video data in an address space of a picture. Therefore, the present invention is capable of accurately blocking a distortion propagation to the adjacent video due to the local bit error.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A data resending method, comprising:
   receiving a resend request message of data received in error, said resend request message including information identifying a storage area where the requested data is stored, said storage area including a copy of the requested data received in error and being divided according to variable-length codes such that an individual variable-length code can be accessed; and
   sending the requested data with data to be currently sent, said sending step including multiplexing the requested data and the data to be currently sent.

2. A method of claim 1, wherein said information includes values indicating a damaged portion of a data packet originally sent.

3. A method of claim 2, wherein said values indicating the damaged portion indicates a range of DCT coefficients corresponding to the damaged portion of the data packet.

4. A method of claim 2, wherein said values indicating the damaged portion indicates a memory address for a range of data packets in a buffer, said range of data packets corresponding only to the damaged portion of the data packet originally sent.

5. The method of claim 1, wherein the multiplexed data is sent over a single channel to a receiver.

6. A video data sending and resending method between a coder and decoder, comprising:
   storing video data in at least one buffer;
   packeting the video data from said at least one buffer and sending the resultant video data packet to a receiver;
   receiving a resend request message of video data if an error is detected in the sent data, the resent request message including information identifying an area of a buffer where the requested video data is stored, said buffer area including a copy the requested video data in error and being divided according to variable-length codes such that an individual variable-length code can be accessed; and
   sending the requested video data with video data to be currently sent from said at least one buffer to the receiver, wherein said step of sending the requested video data includes multiplexing the requested video data and the video data to be currently sent.

7. The method of claim 6, wherein said information includes values to indicate a damaged portion of the video data packet.

8. The method of claim 6, wherein stating the video data further comprises storing the video data in block units including variable length codes, according to a circular addressing manner.

9. The method of claim 8, wherein the resending request message contains values indicating a memory address and range of block units corresponding only to the damaged portion of the video data packet; and
   wherein the step of sending the requested video data comprises sending the range of block units corresponding to the damaged portion of the requested video data with the video data to be current sent, based upon said values.

10. The method of claim 8, wherein the resending request message contains values indicating a range of DCT coefficients corresponding to the damaged portion of the video data packet, and wherein the step of sending the requested video data further comprises sending the video data corresponding to the range of DCT coefficients with the video data to be currently sent.

11. The method of claim 10, further comprising checking whether the block units of the received data packet corresponding to the damaged portion of the requested video data equals the block units indicated in said values.

12. The method of claim 6, wherein storing the video data further comprises:
    storing video data for the current sending in a first buffer; and
    storing a previously sent video data in a second buffer,
    wherein the step of sending the requested video data further comprises sending the requested video data from the second buffer with the video data to be currently sent from the first buffer.

13. The method of claim 6, wherein said at least one buffer is partitioned according to variable length codes of the video data.

14. The method of claim 13, wherein the at least one buffer is partitioned into a plurality of blocks, each block comprising code regions configured to storing variable codes according to direct current and alternating current components, length regions to indicate bit lengths of the code regions, and run regions to indicate execution of the direct current and alternating current components of the corresponding block.

15. The method of claim 6, wherein the step of sending the requested video data includes sending the requested video data with the video data to be current sent to the receiver over a single channel.

16. A video coding and decoding system, comprising:
    at least one buffer being divided according to variable-length codes such that individual variables-length codes can be retrieved;
    a video data coding processor storing a compressed video data in said at least one buffer;
    a data sending processor configured to packet the video data from the at least one buffer and transmit the video data packets; and
    a data receiving processor configured to receive the video data packets and send a resend request message of a video data to the data sending processor if an error is detected, the resend request message including information identifying an area of a buffer where the requested video data is stored, said buffer area including a copy the requested video data in error,
    wherein the data sending processor is further configured to multiplex the requested video data and video data to be currently sent from said at least one buffer to the data sending processor.

17. The system of claim 16, wherein said information includes values indicating a damaged portion of the video data packet.

18. The system of claim 16, wherein the resent request message comprises values indicating a range of DCT coefficients corresponding to the damaged portion of the video data packet, and wherein the data sending processor sends a data portion corresponding to the DCT coefficients with the video data to be currently sent.

19. The system of claim 16, wherein said at least one buffer is partitioned according to variable-length codes and according to block units, and wherein the video data coding processor stores the video data in said at least one buffer in block units, according to a circular addressing manner.

20. The system of claim 19, wherein the resending request message contains values indicating a memory address and range of block units corresponding to the damaged portion of the video data packet, and wherein the data sending processor sends the range of block units corresponding to the damaged portion of the requested video data with the video data to be currently sent, based upon said values.

21. The system of claim 20, wherein the data receiving processor checks whether the block units of the received data packet corresponding to the damaged portion of the requested video data equals the block units indicated in said values.

22. The system of claim 16, further comprising:
a first buffer configured to store video data for the current sending; and
a second buffer configured to store a previously sent video data,
wherein the data sending processor sends the requested video data from the second buffer with the video data to be currently sent from the first buffer.

23. The method of claim 16, wherein said at least one buffer is partitioned according to variable length codes of the video data.

24. The method of claim 23, wherein the at least one buffer is partitioned into a plurality of blocks, each block comprising code regions configured to store variable codes according to direct current and alternating current components, length regions to indicate bit lengths of the code regions, and run regions to indicate execution of the direct current and alternating current components of the corresponding block.

25. The system of claim 16, wherein the data sending processor and the data receiving processor are coupled over a single channel, and wherein the requested data and the data to be currently sent are sent on the single channel.

26. A data resending method, comprising:
receiving a resend request message of data received in error; and
multiplexing the requested data with data to be currently sent, said requested data including only the data received in error, wherein the resend request message includes information identifying a storage area where the requested data is stored, said storage area including a copy of the requested data received in error and being divided accordingly to variable-length codes such that an individual variable-length code can be accessed.

27. The method of claim 26, wherein the information includes a first value indicative of an initial address in which the requested data is stored in a buffer and a second value indicative of a range of addresses of the buffer storing the requested data.

28. The method of claim 26, wherein the storage area is included in a buffer having a plurality of storage areas each identified by a variable-length code, and wherein the information includes a variable-length code corresponding to the storage area.

29. The method of claim 28, wherein the single channel is a logical channel.

30. The method of claim 26, wherein the multiplexing step includes multiplexing the requested data and the data to be currently sent over a single channel to a receiver.

* * * * *